United States Patent [19]

Hanafusa et al.

[11] Patent Number: 4,700,681

[45] Date of Patent: Oct. 20, 1987

[54] FUEL INJECTION SYSTEM FOR AN INTERNAL COMBUSTION ENGINE

[75] Inventors: Tooru Hanafusa; Yukio Kinugasa, both of Susono; Takehisa Yaegashi, Mishima, all of Japan

[73] Assignee: Toyota Jidosha Kabushiki Kaisha, Aichi, Japan

[21] Appl. No.: 849,176

[22] Filed: Apr. 7, 1986

[30] Foreign Application Priority Data

Apr. 8, 1985 [JP] Japan .................................. 60-72756
Apr. 8, 1985 [JP] Japan .................................. 60-72758
Apr. 8, 1985 [JP] Japan .................................. 60-72759

[51] Int. Cl.$^4$ ........................................... F02M 51/00
[52] U.S. Cl. ..................................... 123/478; 123/480; 123/481
[58] Field of Search ................... 123/481, 198 F, 478, 123/480, 492, 493

[56] References Cited

U.S. PATENT DOCUMENTS

| | | | |
|---|---|---|---|
| 4,276,863 | 7/1981 | Sugasawa et al. | 123/481 |
| 4,357,924 | 11/1982 | Sugasawa et al. | 123/481 |
| 4,385,600 | 5/1983 | Sugasawa et al. | 123/481 |
| 4,462,351 | 7/1984 | Fujii et al. | 123/481 |
| 4,466,404 | 8/1984 | Ueno et al. | 123/481 |
| 4,467,758 | 8/1984 | Ueno et al. | 123/481 |
| 4,469,071 | 9/1984 | Bassi et al. | 123/481 |
| 4,509,488 | 4/1985 | Forster et al. | 123/481 |
| 4,535,744 | 8/1985 | Matsumura | 123/481 |
| 4,541,387 | 9/1985 | Morikawa | 123/198 F |
| 4,550,704 | 11/1985 | Barbo et al. | 123/481 |
| 4,580,541 | 4/1986 | Koumura | 123/478 |
| 4,590,912 | 5/1986 | Atago | 123/478 |
| 4,637,362 | 1/1987 | Yasuoka et al. | 123/478 |

*Primary Examiner*—Raymond A. Nelli
*Attorney, Agent, or Firm*—Kenyon & Kenyon

[57] ABSTRACT

A fuel injection system for a multi-cylinder internal combustion engine wherein fuel injectors are provided for each of the cylinders. The injectors are divided into two groups, the cylinders in each of the groups having operational phases which are spaced from each other by a crank angle of 360 degrees. Injection systems are provided for each group for attaining independent injections between the groups. In each of the groups, a basic amount of fuel for one engine cycle, and then a final injection amount, is calculated, as a difference of the basic amount with respect to the actual amount of fuel injected during a preceding injection of the corresponding group. An injection of a precise amount of fuel is attained irrespective of any change in the engine condition.

12 Claims, 19 Drawing Figures

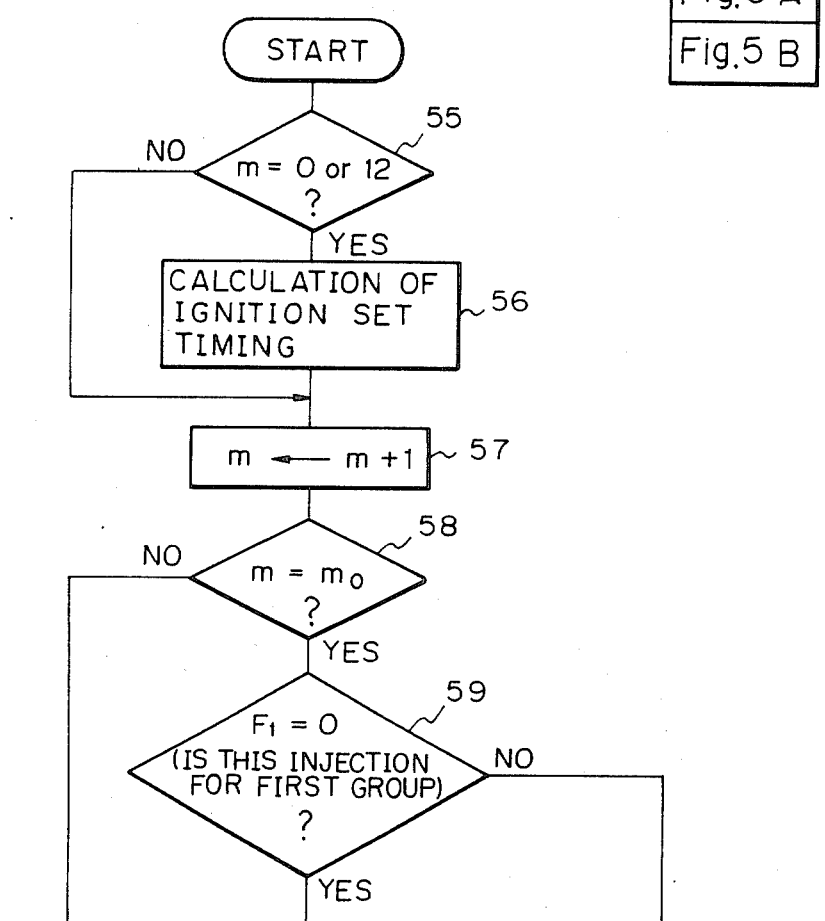

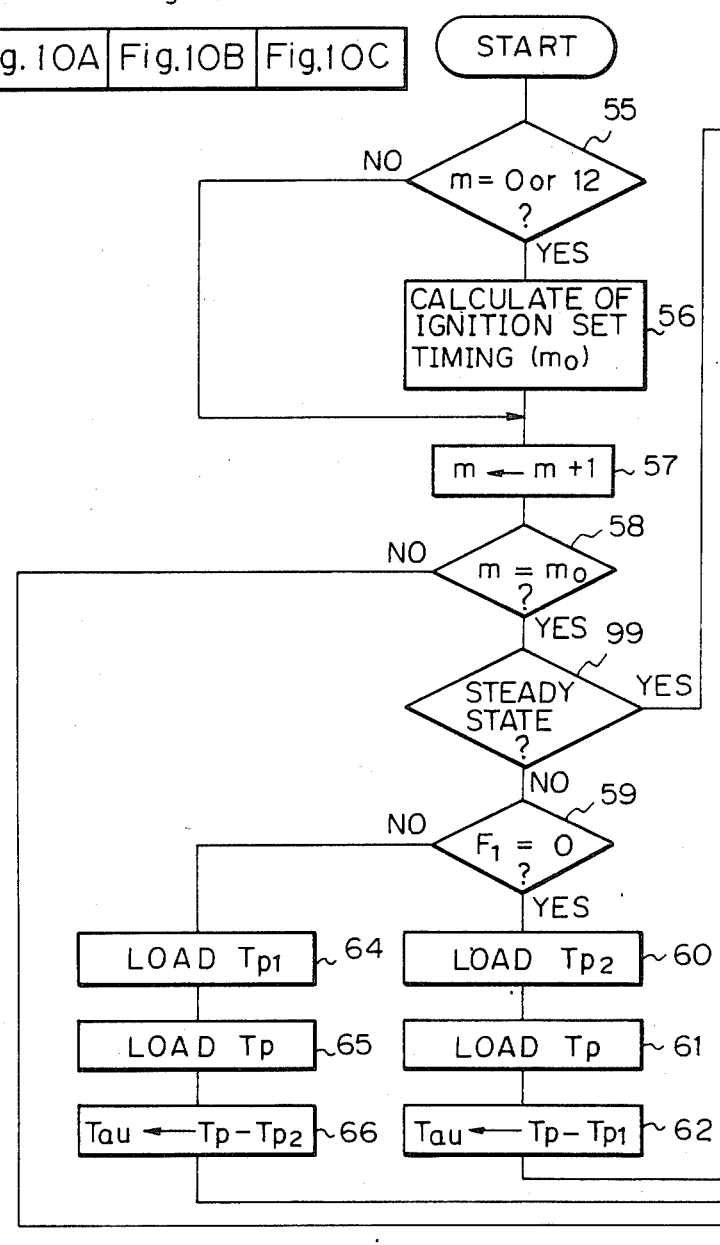

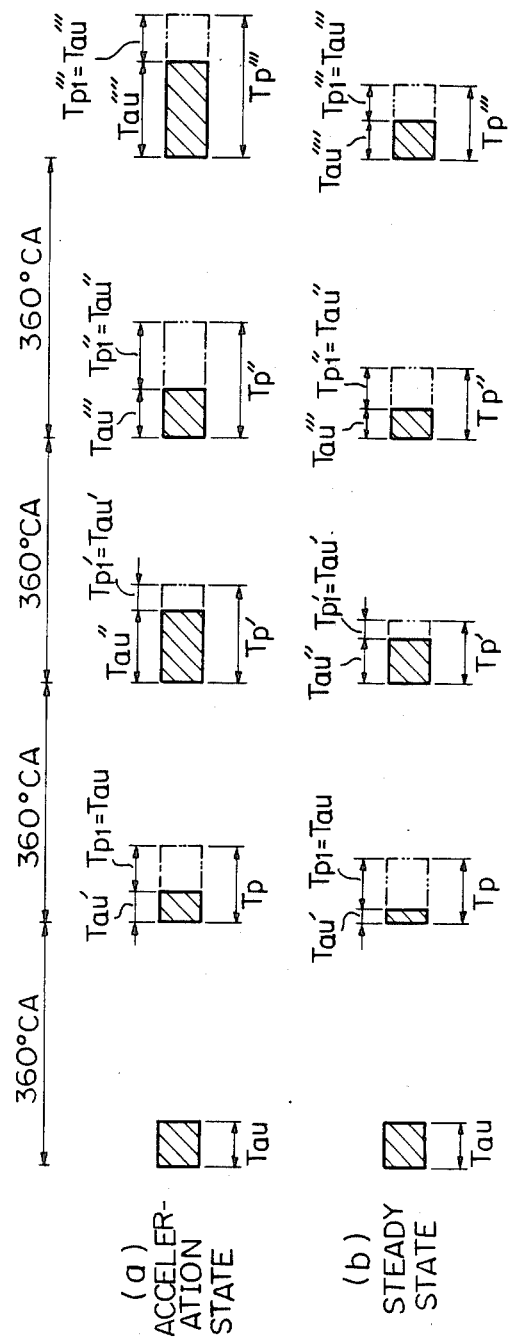

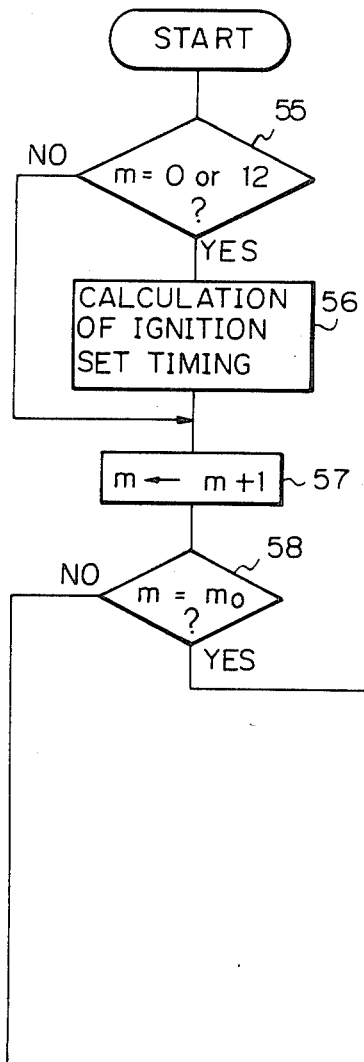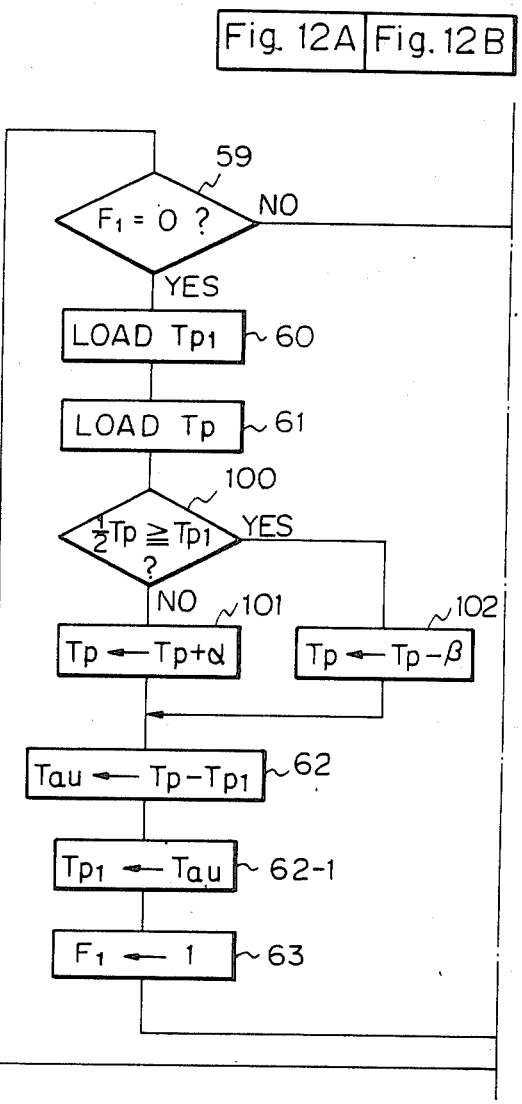
Fig. 12A
Fig. 12
| Fig. 12A | Fig. 12B |

FUEL INJECTION SYSTEM FOR AN INTERNAL COMBUSTION ENGINE

BACKGROUND OF THE INVENTION

1. Field of the Invention

The present invention relates to a fuel injection system for an internal combustion engine. More particularly, it relates to a fuel injection system applied to an engine in which the cylinders are divided into two groups, and in which each group of cylinders has a phase separated by 360 degrees of crankshaft angle (CA).

2. Description of the Related Art

Known in the prior art is a fuel injection system for an internal combustion engine wherein the cylinders having a phase separated by 360 degrees CA are grouped, and fuel injections are independently attained between the groups. The injection for each of the groups is effected synchronously with the each of intake strokes of cylinders in the respective groups. This means that two injections are attained, for each of the groups of injectors, during one engine cycle corresponding to 720 degrees CA. In order to correct a change in the amount of fuel induced by a change in the engine conditions, such as acceleration or deceleration, a difference in the values of the basic amount of fuel for two consecutive injections calculated for every injection timing is calculated, to determine whether or not the correction should be attained. If the difference is larger than a predetermined value, the correction is attained by multiplying a correction factor, varied in accordance with the degree of acceleration, by the basic fuel amount to obtain the final fuel injection amount.

The basic idea of the prior art is that the correction of the fuel amount is effected upon detection of a difference in the values of the basic fuel amount between the consecutive injections which is larger than the predetermined value. Therefore, a correction is not attained when the difference between the consecutive values of the basic amount is lower than the predetermined value, causing the amount of fuel actually injected to be different from the value of the amount of fuel actually required by the engine. If the predetermined value is set at a small value, a correction of fuel may be unnecessarily attained during the steady state. Furthermore, in the prior art, the fuel amount correction is attained by multiplying the correction factor by the basic amount. However, this method of correction cannot obtain an appropriate amount of fuel during a transient state of the engine.

SUMMARY OF THE INVENTION

Accordingly, an object of the present invention is to provide an injection system for an internal combustion engine capable of obtaining an appropriate amount of fuel for injection to the engine irrespective of any change in the engine conditions.

According to the present invention, a fuel injection system for a four stroke internal combustion engine is provided, which comprises: injecting means for regulating the flow of fuel injected into the engine; timing means for providing timing signals corresponding to crankshaft angle positions in one engine cycle; a first calculating means for calculating, in accordance with the engine operating conditions, a basic amount of fuel for a plurality of consecutive fuel injections; a memory means for storing an immediately preceding amount of fuel injected by the injecting means upon receipt of the preceding timing signal; a second calculating means for calculating a final amount of injected fuel corresponding to the difference between the basic amount and the stored injected amount during the preceding injection timing; and, operating means, responsive to the timing signal from the timing means, for operating the injecting means for a fuel injection period in accordance with the final amount of injected fuel.

BRIEF DESCRIPTION OF THE DRAWINGS

FIG. 11 is a chart similar to FIG. 9, for the embodiment shown in FIG. 10; and

DESCRIPTION OF THE PREFERRED EMBODIMENTS

Figure 1:
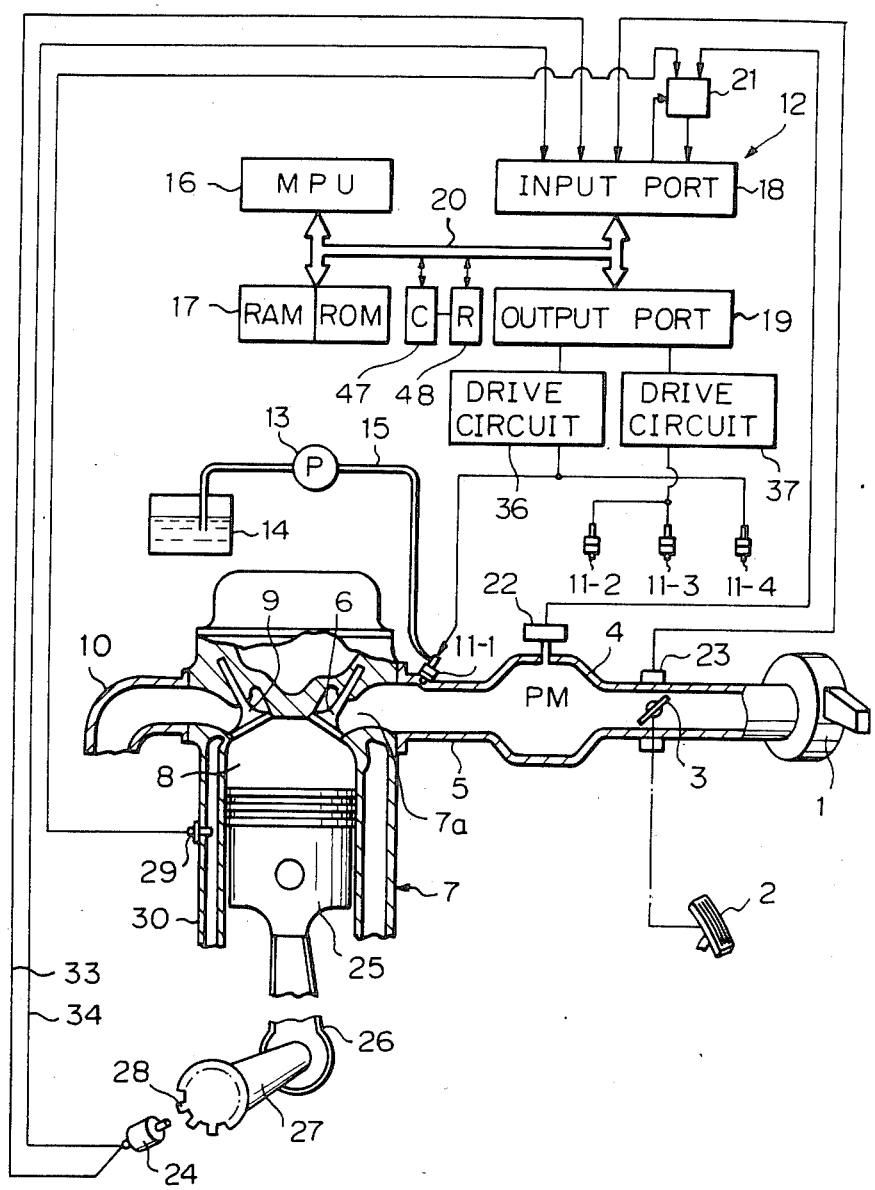
FIG. 1 is a schematic view of the fuel injection system according to the present invention.

FIG. 1 schematically illustrates an internal combustion engine provided with a fuel injection system according to the present invention. An amount of air passed through an air cleaner 1 is controlled by a throttle valve 3 connected to an accelerator pedal 2. The air is introduced, via a surge tank 4, an intake pipe 5, and an intake valve 6, to a combustion chamber 8 of an engine body 7. An exhaust gas resultant from the combustion in the combustion chamber 8 is removed, via an exhaust valve 9, by an exhaust pipe 10. This engine is, for example, provided with four cylinders, and therefore, four fuel injectors 11-1, 11-2, 11-3, and 11-4 are provided in the respective intake pipes 5 at a position adjacent to the respective intake ports 7a. The fuel injectors 11-1, 11-2, 11-3, and 11-4 are divided into first and second groups, wherein the grouping is such that the cylinders belonging to each of the groups have respective operational phases which are spaced at a value of 360 degrees CA. In the particular arrangement of the engine, the ignition in the cylinders is attained in the order of number #1, #3, #4 and #2 cylinder, during the one complete engine cycle, i.e., 720 degrees CA. Therefore, the first group includes the fuel injectors 11-1 and 11-4 of the first and fourth cylinders, and the second group includes the fuel injectors 11-2 and 11-3 of the second and third cylinders, respectively. As will be fully described later, the injectors 11-1 and 11-4 and 11-2 and 11-3 of the first and second groups are operated independently. Reference numeral 12 designates an electronic control circuit as a micro-computer system for attaining the independent group fuel injection operation. A fuel pump 13 is connected, via a fuel supply conduit 15, to the fuel injectors 11-1, 11-2, 11-3, and 11-4 for forcibly supplying fuel from the fuel tank 14 to those fuel injectors.

The electric control circuit 12 as a micro-computer system has, as essential components, a micro-processing unit (MPU) 16, a memory 17 comprised by a read only memory (ROM) and a random access memory (RAM), and input port 18, an output port 19, and a bus 20 interconnecting these elements for transmitting commands and data therebetween.

A pressure sensor 22 is adapted for providing an analog signal indicating an absolute pressure at the surge tank 4 corresponding to the load of the engine, and a throttle sensor 23 detects the degree of opening of the throttle valve 3. The throttle sensor 23 is, for example, constructed as a rotary switch for producing pulse signals, a number of which corresponds to the degree of opening of the throttle valve 3. A crank angle sensor 24 detects a position of a crankshaft 27 of the engine, to which is connected a connecting rod 26 connected to a piston 25. The crank angle sensor 24 is, for example, constructed as a Hall element facing magnetized teeth members 28 for producing pulse signals. The pulse distance of these pulse signals is utilized to detect the engine speed. These pulse signals are also used as a triggering signal for commencing a fuel injection routine in the control circuit 12. A coolant temperature sensor 29 is connected to the engine body 7, in contact with the engine coolant, to provide an analog signal indicating the temperature of the engine coolant.

Figure 8:
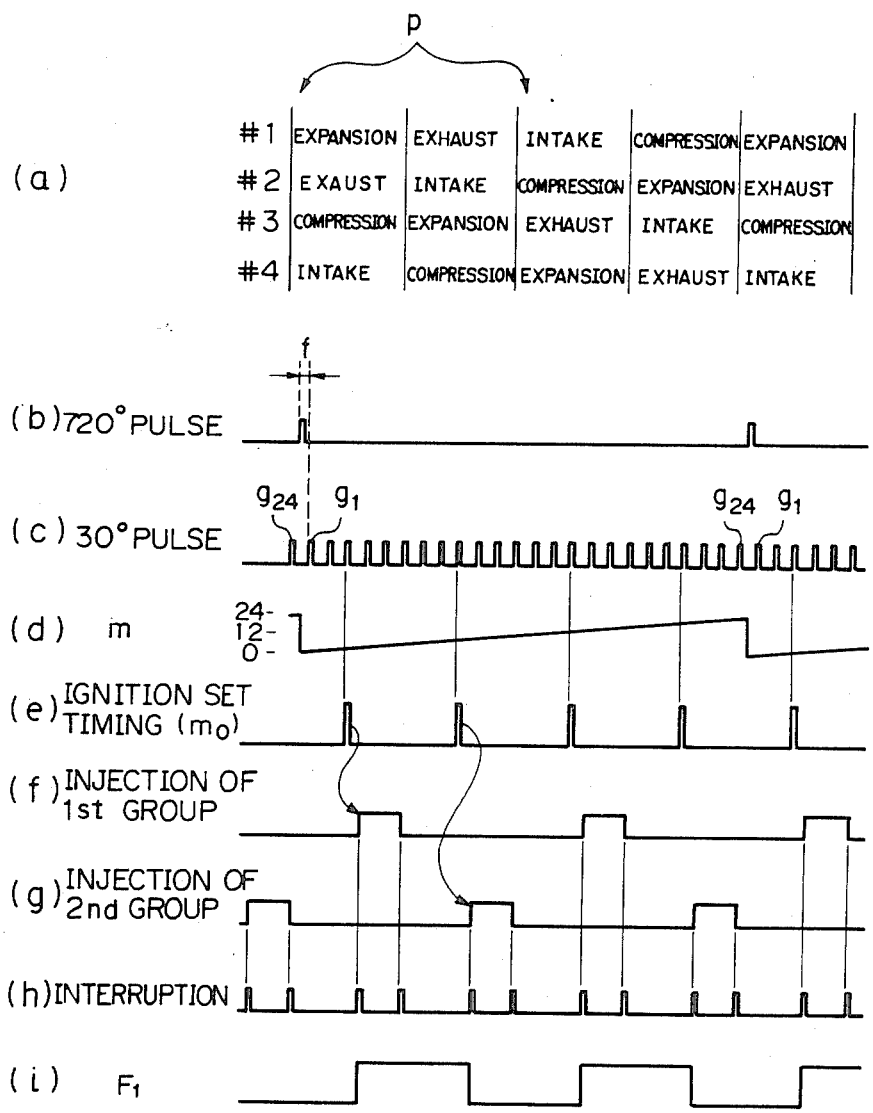
FIG. 8 shows timing charts illustrating the operation of the control circuit in FIG. 1.

The outputs of the pressure sensor 22, throttle sensor 23, and engine coolant temperature sensor 29 are connected to an analog-to-digital converter 21. As well known to those skilled in this art, the A/D converter 21 is provided with a multiplexer for sequentially inputting the signals from the analog sensors 22 and 29 for providing digital signals to be input to the input port 18. The crank angle sensor 24 is provided with a first output for producing pulse signals for every 30 degrees rotation of the crankshaft 27, and a second output for producing pulse signals for every rotation of the crankshaft 27 of 720 degrees, as shown in FIG. 8-(b) and (c), respectively. These pulse signals are input to the input port 18 via lines 33 and 34, respectively. The pulse signal from the throttle sensor 23 is also input to the input port 18.

The output port 19 is connected to a drive circuit 36 for operating the first group of injectors 11-1 and 11-4 and to a drive circuit 37 for operating the second group of injectors 11-2 and 11-3. The MPU 16 operates, in accordance with programs stored in the ROM portion of the memory 17, to calculate fuel injection periods, and to issue signals directed to the drive circuits 36 and 37 for operating the respective groups of fuel injectors (11-1 and 11-4; 11-2 and 11-3) for the calculated periods.

The routines attained by the control circuit 12 will be described with reference to the flowcharts.

Figure 2:
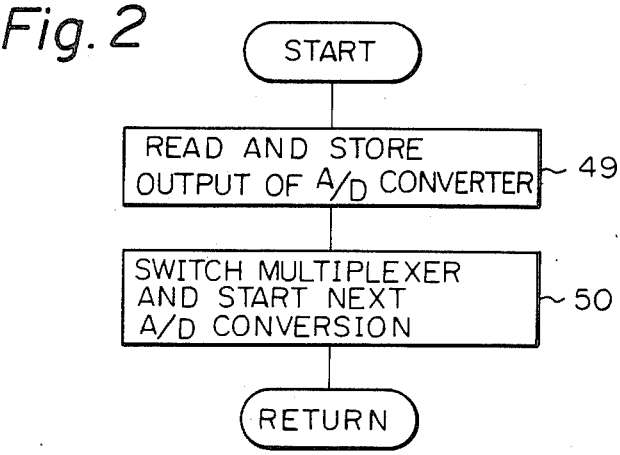
FIGS. 2 through 6 are flowcharts illustrating routines attained by a control circuit in FIG. 1.

FIG. 2 illustrates a flow chart for illustrating how the analog-to-digital conversion routine is attained. The MPU 16 issues a control signal directed to the A/D converter 21 to select one channel connected to one of the analog sensors, such as the pressure sensor 22, so as to commence the conversion of the analog signal to a digital signal. When such analog-to-digital conversion is completed, an interruption signal is sent from the A/D converter 21 to the MPU 16 to start an interruption routine as shown in FIG. 2. At point 49, the output data from the A/D converter 21 is read out, and this data is stored in a predetermined RAM area of the memory 17 for storing the intake pressure data. At the following point 50, a command signal is issued to the A/D converter 21 for selecting the channel connected to the next analog sensor, such as the engine coolant temperature sensor 29, so as to commence to convert the analog signal therefrom to a digital signal.

Figure 3:
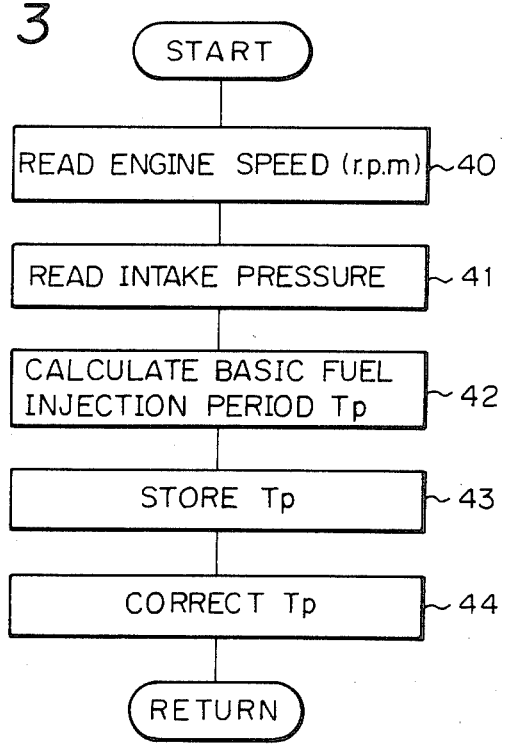

FIG. 3 shows a routine for calculating a basic fuel injection period. This routine is entered into calculation by an interruption signal from an oscillator or timer counter at a predetermined time interval, such as 2 msec. or 4 msec. At points 40 and 41, the data of the engine speed and intake pressure stored in the RAM areas is read out respectively.

At point 42, a basic fuel injection period Tp corresponding to the amount of fuel for two fuel injections from an injector is determined so as to attain the stoichiometric air/fuel ratio. The injection period Tp corresponding to the amount of fuel for two fuel injections per single injector is very important for attaining the object of the present invention, as will be fully described later. The calculation of the basic injection period Tp is calculated by a map extrapolation method which is, per se, known. The ROM area of the memory 17 is provided, as shownby the following Table, with a data map comprised by data of the engine revolution number per one rotation (r.p.m.), $D_1$; data of the intake pressure $D_2$; data of the fuel injection period Tp corresponding to the amount of fuel for two fuel injections per one injector, $D_3$; and numbers of the addresses of the ROM, $D_4$.

| $D_1$ | $D_2$ | $D_3$ | $D_4$ |
| --- | --- | --- | --- |
| 400 | $P_0$ | $T_1$ | A |
| 400 | $P_1$ | $T_2$ | A + 1 |
| : | : | : | : |
| : | : | : | : |
| 400 | $P_9$ | $T_9$ | A + 9 |
| 800 | $P_0$ | $T_{10}$ | A + 10 |
| 800 | $P_1$ | $T_{11}$ | A + 11 |
| : | : | : | : |
| : | : | : | : |
| 800 | $P_9$ | $T_{19}$ | A + 19 |
| 1200 | $P_0$ | $T_{20}$ | A + 20 |
| : | : | : | : |
| 5600 | $P_0$ | $T_{130}$ | A + 130 |
| 5600 | $P_1$ | $T_{131}$ | A + 131 |
| : | : | : | : |
| 5600 | $P_9$ | $T_{139}$ | A + 139 |

As will be seen from the Table, the engine speed data $D_1$ is selected from a value of 400 r.p.m. to 5600 r.p.m. for an interval of 400 r.p.m. Ten values of intake pressure $P_0$ to $P_9$ are employed at appropriate intervals. Note; $P_0 < P_1 < \ldots < P_9$. A fuel injection period Tp is calculated under the two-dimensional extrapolation method in the following way. When, for example, an actual engine speed is 1000 r.p.m. and the value of the actual intake pressure P is between $P_5$ to $P_6$, the data of the fuel injection periods $T_{15}$ and $T_{16}$ is read out from the addresses A+15 and A+16 where the data of intake pressure $P_5$ and $P_6$ at 800 r.p.m. is stored. The data of the fuel injection periods $T_{25}$ and $T_{26}$ are then read out from the addresses A+25 and A+26 where the data of the intake pressure $P_5$ and $P_6$ at 1200 r.p.m. is stored. Then, the following calculation is attained.

$$Ta = ((T_{16} - T_{15})/(P_6 - P_5))(P - P_5) + T_{15} \quad (1)$$

$$Tb = ((T_{26} - T_{25})/(P_6 - P_5))(P - P_5) + T_{23} \quad (2)$$

$$Tp = ((Tb - Ta)/400)(1000 - 800) + Ta \quad (3)$$

At the following point 43 of FIG. 3, the thus calculated basic fuel injection period $T_p$ is stored in a predetermined RAM area of the memory 17. At point 44, the basic fuel injection period $T_P$ is corrected by an engine coolant temperature or an intake air temperature in a manner which is, per se, known. The basic value is, for example, corrected so as to increase when the engine coolant temperature is low.

Figure 4:
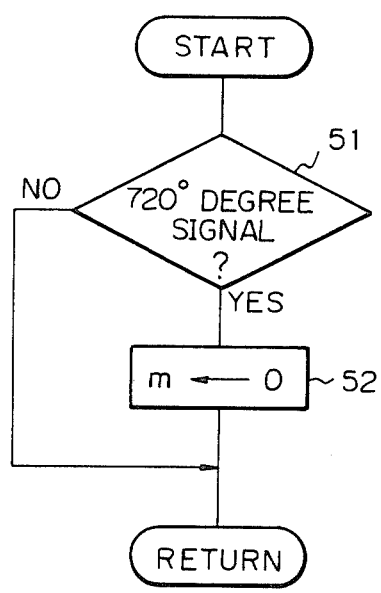
Figure 7:
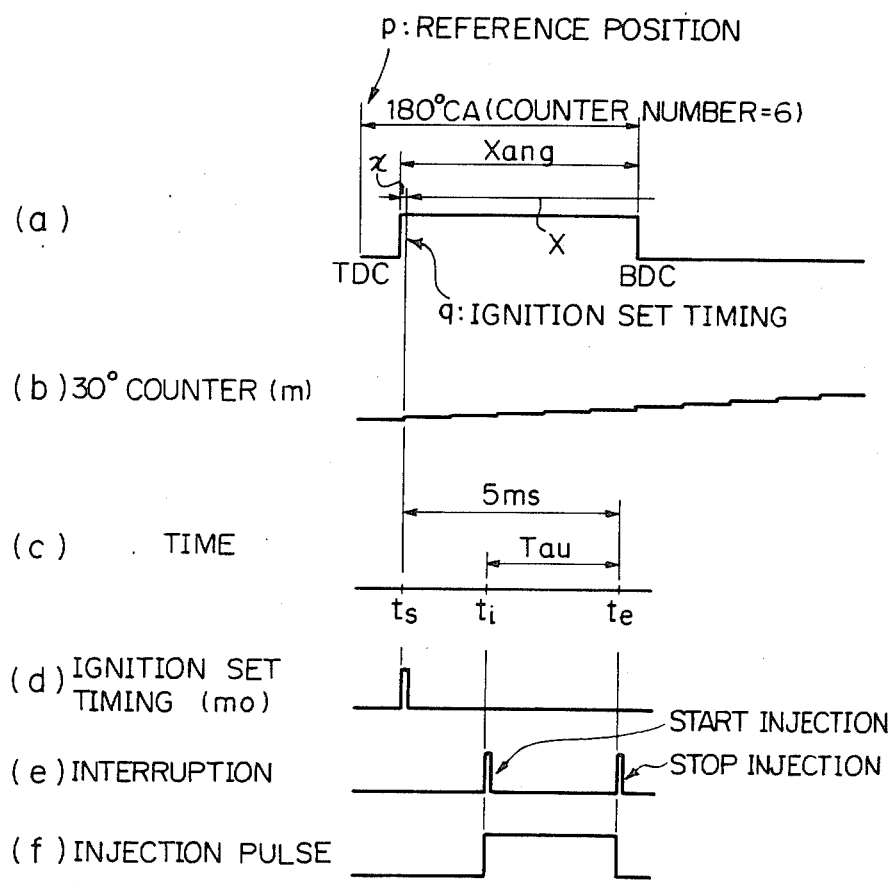
FIG. 7 shows timing charts illustrating how fuel injection is attained.

FIG. 4 shows a routine for resetting a counter (m) for discrimination of the group of cylinders designated for the following fuel injection. As shown in FIG. 7-(b), the counter (m) is incremented at every instance when the 30° CA signal, as shown in FIG. 8-(c), is received from the crank angle sensor 24. In addition to this 30° signal, the crank angle sensor 24 issues pulse signals at every 720 degrees CA of the crankshaft 27, as shown by FIG. 8-(b). At a discrimination point 51 in FIG. 4, it is judged if the 720° CA signal is now coming. If the judgement is "yes" at point 51, the routine goes to point 52 where the counter (m) is reset.

Figure 5B:
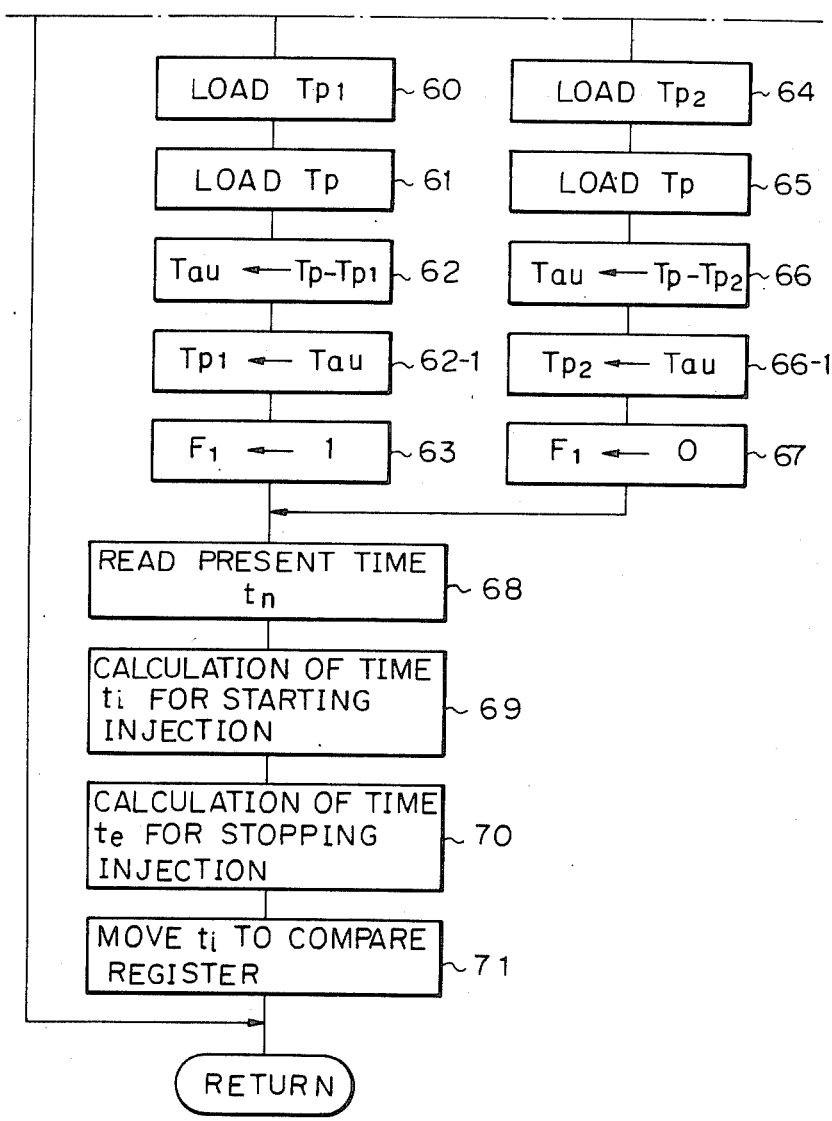

FIG. 5 shows a routine for determining the timing for energizing the fuel injectors 11-1 and 11-4; 11-2 and 11-3, which routine is executed at every interval of 30 degrees CA detected by the crank angle sensor 24. The counter (m) is incremented for every 30 degrees CA (step 57) and is cleared by the 720 degrees CA pulse, as already illustrated with reference to FIG. 4. Therefore, the counter (m) has integer values from 0 to 24, as shown in FIG. 8-(d), in one complete engine cycle corresponding to 720 degrees CA. At point 55 in FIG. 5, it is judged whether the value of the counter (m) is 0 or 12. The value of 0 or 12 of the counter (m) means, as shown in FIG. 8-(a), that the first and fourth cylinders belonging to the first group are at position near top dead center in an intake or expansion stroke. This position becomes a reference position for calculating an injection signal. At this reference position, the second and the third cylinders belonging to the second group are in positions near to the bottom dead center during the exhaust or compression strokes.

When the result of the judgement at point 55 is "No", the routine goes directly to point 57 for incrementing the counter (m). If the result of the judgement at point 55 is "yes", the routine goes first to point 56 and then to point 57. At point 56, a preset value $m_0$ of the counter (m) for determining a timing which corresponds approximately to the timing for actually starting the fuel injection is determined, and the calculated value is stored in the memory 17. This preset value of the counter $m_0$ is referred to as an "ignition set timing", and is calculated in the following way. As well known to those skilled in this art, the fuel injection is required to end before the intake stroke is completed, in order to attain a flow of a combustion mixture having a good stratified condition introduced into the combustion chamber. Assuming the maximum period of the fuel injection period is 5 mseconds, the angle of rotation of the crankshaft 27 during this period, Xang, is calculated by the following equation.

$$Xang = ((Ne \times 360°)/(60) \times (5/1000) \quad (4)$$

-continued
$$= (30 \times NE)/1000$$

In the above equation, NE is the engine speed (r.p.m.). Since the injection reference timing should be a multiple of 30 (degrees), Xang/30 is calculated to obtain the quotient X and remainder x. In FIG. 7-(a), the ignition set timing for the injectors 11-1 and 11-4 of the first group measured from the reference position p, i.e., top dead center (TDC) of the first or fourth cylinder at the intake or expansion stroke, becomes (6−X), if the value of (6−X) is positive. (See FIG. 7.) If the value (6−X) is negative, the ignition set timing q is fixed to zero. The ignition set timing of the injectors 11-2 and 11-3 of the second group measured from the reference position, i.e., the top dead center of the first or fourth cylinder of the first group during the intake or expansion stroke, becomes (6−X+6) since there is a crank angle difference of 180 degrees (180/30=6) in operational phase between the two groups. Since (6−X) or (6−X+6) is measured with respect to the reference position corresponding to the value of 0 or 12 of the counter (m), the injection set value $m_0$ measured from the reference position p, that is, the bottom dead center (BDC) of the first or fourth cylinder in the first group, becomes this value (0 or 12) of the counter (m) added to (6−X) or (6−X+6). FIG. 7 shows how the determination of the ignition set timing is attained with regard to the first group of the cylinders. The 30 degree counter (m) is incremented for every 30 degrees rotation of the crankshaft 27, as shown by FIG. 7-(b). The fuel injection should be completed before the bottom dead center (BDC) of the intake stroke for an angle Xang corresponding to the maximum fuel injection period of, for example, 5 msec. Therefore, the ignition set timing q as a reference point for calculating the injection signal should be at the point of Xang before the BDC for allowing the fuel injection to be finished before the completion of the intake stroke. The distance between the top dead center (TDC) as the reference point p and the bottom dead center (BDC) is 180 degrees CA, corresponding to the value of 6 of the counter (m). Therefore, the ignition set timing q measured from the reference position p as the number of the counter $m_0$ becomes 6−X (X is equal to the quotient of Xang/30).

Returning to the flow chart of FIG. 5, at point 58, it is judged if the value of the counter (m) is equal to $m_0$. If (m) is not equal to $m_0$, the routine returns to the main routine. The equality of (m) and $m_0$ means that it is now a time $t_s$ (FIG. 7-(c)) corresponding to the ignition set timing q. At the following point, it is judged if the flag $F_1 = 0$. This flag $F_l$ is set (1) when a fuel injection amount calculation for the first group of injectors 11-1 and 11-4, which is once executed at every injection operation of the first group, is attained. The flag $F_1$ is reset (0) when the fuel injection amount calculation for the second group of injectors 11-2 and 11-3, which is once executed for every injection operation of the second group, is attained. A "yes" result at point 59 means that the calculation of the final fuel injection period to be effected from now is for the first group of injectors 11-1 and 11-4. The program then goes to point 60 where the injected fuel amount Tau at the preceding fuel injection of the second group, $Tp_l$, is loaded. At point 61, the newest value of the basic fuel injection amount Tp calculated by the routine of FIG. 3 is loaded. At point 62, the final fuel injection amount Tau as the difference Tp−Tp₁ is calculated. At point 62-1, the value of Tau is moved to Tp₁ which is used in the following routine for calculating the final fuel injection period of the first group at step 60. At the following point 63, the flag F₁ is set, which means that the injection to be effected from now is for the first group of injectors 11-1 and 11-4.

A result of "No" at point 59 (F₁=1) means that the calculation of the final injection period is for the second group of injectors 11-2 and 11-3. The program then flows to point 64 where the injection period Tp₂ during the preceding fuel injection of the second group is loaded. At point 65, the newest value of the injection period Tp calculated by the routine of FIG. 3 is loaded. At point 65, a final injection period Tau as a difference Tp−Tp₂ is calculated. At point 66-1, Tau is moved to Tp2. At point 67, the flag F₁ is reset, which means that the injection to be effected from now is for the second group of injectors 11-2 and 11-3.

When the final fuel injection period has been thus calculated for the respective groups of injectors, the routine goes to point 68 where the present time $t_n$ is read as a value of a free run counter 47 provided in the control circuit 12. At the following point 69, the time $t_i$ (FIG. 7-(c)-) for commencing the fuel injection is calculated. Since 5 msecond is, at maximum, required for reaching the bottom dead center (BDC) in the intake stroke from the injection set timing q, the time $t_i$ becomes equal to $t_n$ (present time) plus 5 msec. - Tau (final fuel injection period)), as shown in FIG. 7-(c). When 5 < Tau, the fuel injection start time $t_i$ becomes equal to $t_n$. At the following point, a fuel injection stoppage time $t_e$ is calculated from $t_e = t_i + $ Tau.

At the following point 71, data related to the time $t_i$ for commencing the injection is moved to a compare register 48 provided in the control circuit 12. As well known to those skilled in this art, the compare register is provided with a first input connected to the free run counter and a second input for receiving the data related to $t_i$.

Figure 6:
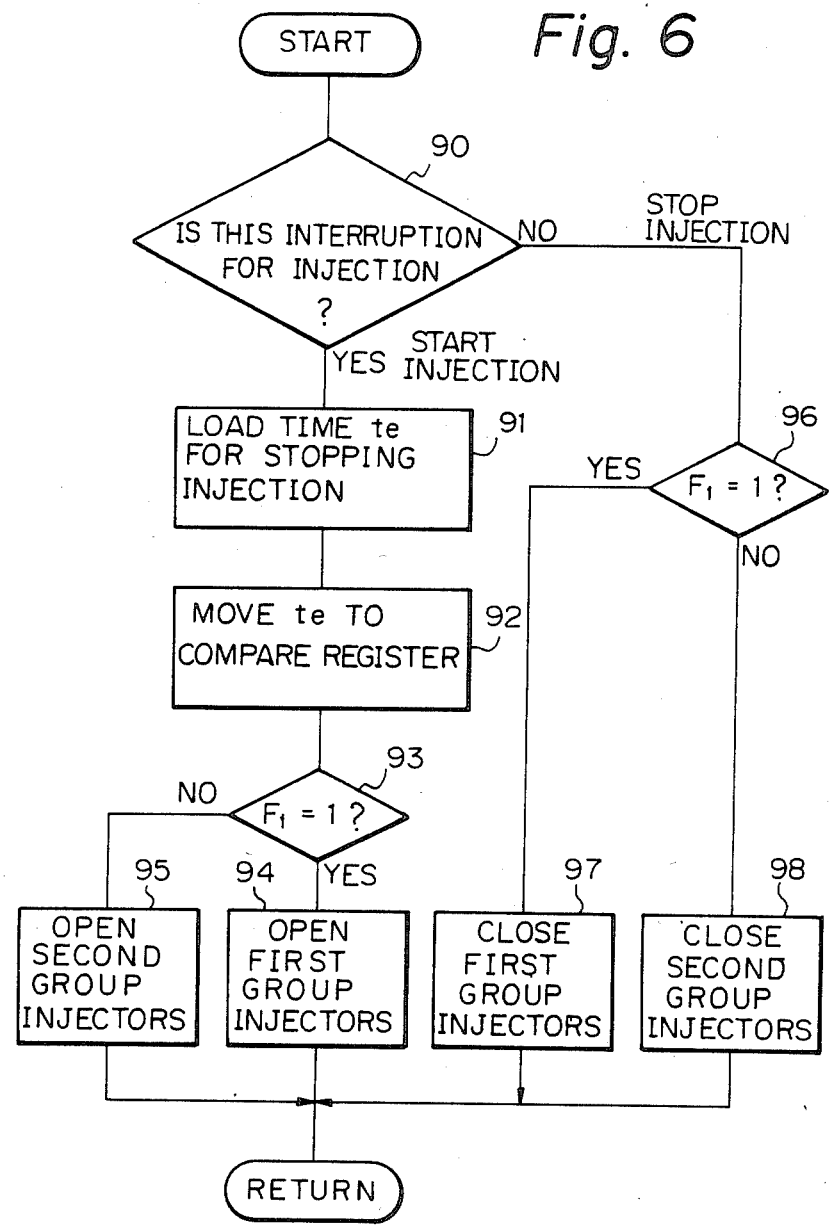

FIG. 6 shows an interruption routine entering into calculation when, at the compare register 48, the values at the two inputs thereof coincide with each other. At point 90, it is judged if this interruption routine is for the commencement of the fuel injection. When the present time $t_n$ coincides with the time $t_i$ for commencement of the fuel injection (FIG. 7-(c) and (e)), the routine goes from point 90 to point 91 where data related to time $t_e$ for stopping the fuel injection is loaded. At point 92, the data $t_e$ is moved to the corresponding input of the compare register 48. At point 93, it is judged if the flag F₁ is 1. When the routine is for injecting the first group of injectors 11-1 and 11-4, the routine from point 93 flows to point 94, where a signal from the input port 19 is input to the drive circuit 36 for opening the injectors 11-1 and 11-4 of the first group. As a result, injection of the fuel from the first group of injectors 11-1 and 11-4 is started. When the flag F₁=0, the routine from point 83 flows to point 95, where a signal from the input port 19 is issued to the drive circuit 37 for opening the injectors 11-2 and 11-3 of the second group. As a result, injection of fuel from the second group of injectors 11-2 and 11-3 is started.

When the present time $t_n$ coincides with the time $t_e$ for stoppage of the fuel injection, the routine goes from point 90 to point 96 where the flag F₁ is 1. When the fuel injection to be stopped is for the first group of injectors 11-1 and 11-4, the routine goes from point 96 to point 97 where the output port 19 issues a signal to the drive circuit 36 so that the first group of fuel injectors 11-1 and 11-4 are closed. Therefore, fuel injection from the injectors 11-1 and 11-4 is stopped. When the fuel injection to be stopped is for the second group of injectors 11-2 and 11-3, the routine goes to point 98 where the output port 19 issues a signal directed to the drive circuit 37 for closing the second group of injectors 11-2 and 11-3. Therefore, the fuel injection from the second group of injectors 11-2 and 11-3 is stopped.

FIG. 8 shows general timing charts illustrating the operation of the present invention. FIG. 8-(a) shows the change in cycle between the intake, compression, expansion, and exhaust strokes for every cylinder in accordance with the lapse of time. FIG. 8-(b) shows the pulse signal issued at every crankshaft rotation of 720 degrees CA, corresponding to one complete engine rotation. FIG. 8-(c) shows the pulse signal issued at every rotation of the crankshaft of 30 degrees CA, wherein $g_1$ shows the first 30 degrees CA signal after the 720 degrees CA signal, and $g_{24}$ shows the 24th 30 degrees CA signal. A time difference f exists between the adjacent 720 degrees CA pulse and the first 30 degrees CA pulse $g_1$. FIG. 8-(d) illustrates the change in the value of the counter (m). FIG. 8-(e) shows the ignition set timing $m_0$ for attaining the calculation of the fuel injection amount. FIGS. 8-(f) and (g) show injection pulse signals for the first and second groups of injectors 11-1 and 11-4; 11-2 and 11-3, respectively. FIG. 8-(h) shows interruption pulses for commencing the fuel injection and for stopping the fuel injection. FIG. 8-(i) shows the change in condition of the flag F₁.

Figure 9:
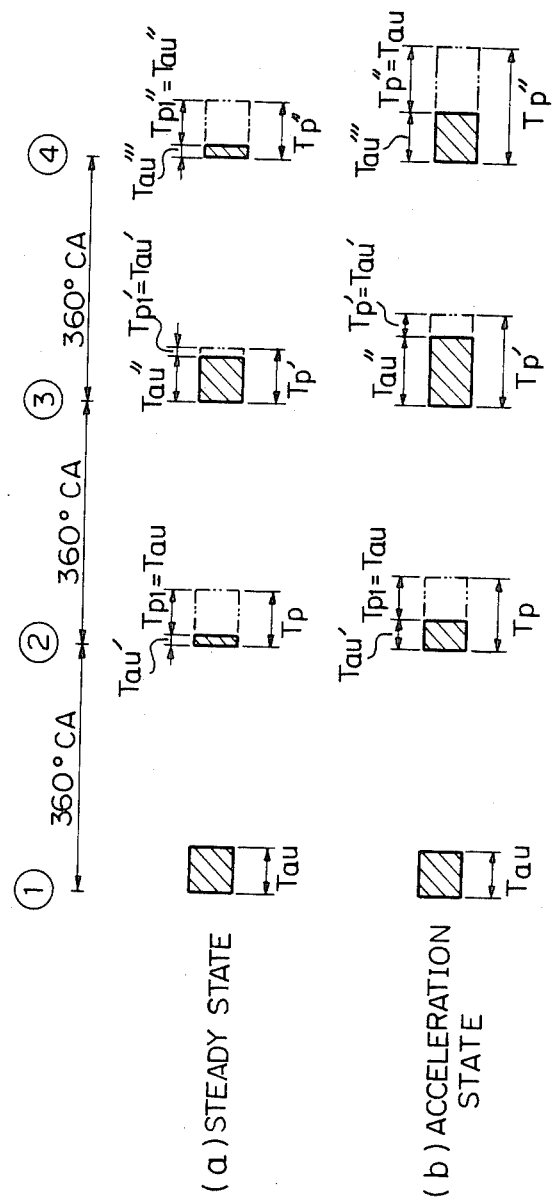
FIG. 9 schematically illustrates how the injected fuel amount changes in a system in a first embodiment of the present invention in accordance with the lapse of time.

FIG. 9-(a) schematically illustrates, in the first embodiment of the invention, the change in the injected amount of fuel along the lapse of time in the first group of injectors 11-1 and 11-4 when the engine is in a steady state. In this embodiment, a fuel injection of one of the groups is attained at every interval of 360 degrees CA. At the first phase ①, an amount of fuel Tau is injected. At the second phase ②, after the lapse of a 360 degrees CA, a basic fuel injection period Tp, corresponding to the fuel amount for one engine cycle for this group, i.e., two consecutive injections, is calculated, and then a final injection period Tau' as the basic injection period Tp subtracted by the preceding final fuel injection period Tp1 (=Tau), is calculated. In other words, Tau'=Tp−Tp1.

Since Tp corresponds to the amount of fuel to be injected for two consecutive injections for one injector, it is considered that, at the first stage ①, a part of the fuel with respect to the calculated amount Tp is injected, and then, at stage ②, the remaining part Tau' with respect to the calculated amount Tp is injected. This means that the amount of fuel now to be injected corresponds to the fuel amount which is short with respect to the calculated amount Tp. In the same manner, at the following phases ③ and ④, the amount of fuel to be injected Tau'' and Tau''' corresponds to the fuel amount which is short with respect to the calculated amount Tp' and Tp''. It should be noted that, since the engine is in the steady state, the basic fuel injection periods Tp, Tp', and Tp'' have the same value.

When the engine is under acceleration, the value of the basic fuel injection periods Tp, Tp', and Tp'' at the stages ①, ②, and ③, respectively, increase with the lapse of trme as shown in FIG. 9-(b). However, the same principle of the fuel injection operation of the invention is obtained wherein the fuel injection amounts Tau', Tau'', and Tau''' now to be attained correspond to the fuel amount which is short with respect to the calculated amounts Tp, Tp', and Tp", respectively.

Since the actual amount of fuel to be injected corresponds to the basic fuel injection amount for two consecutive injections for one injector, subtracted by the amount of fuel actually injected during the preceding period, the introduction of an appropriate amount of fuel to the engine is always attained. Therefore, a quick response of the engine is obtained together with a high fuel consumption efficiency as well as a low production of a toxic emission of exhaust gas.

Furthermore, according to the present invention, the acceleration correction of the fuel injection amount, which has been essential for the prior art injection system, becomes unnecessary for maintaining an appropriate air/fuel ratio during the acceleration condition of the engine. Therefore, the hardware and software construction of the control circuit can be simplified. In other words, an acceleration detecting device, as well as logic and memory units connected thereto, can be eliminated.

Figure 10B:
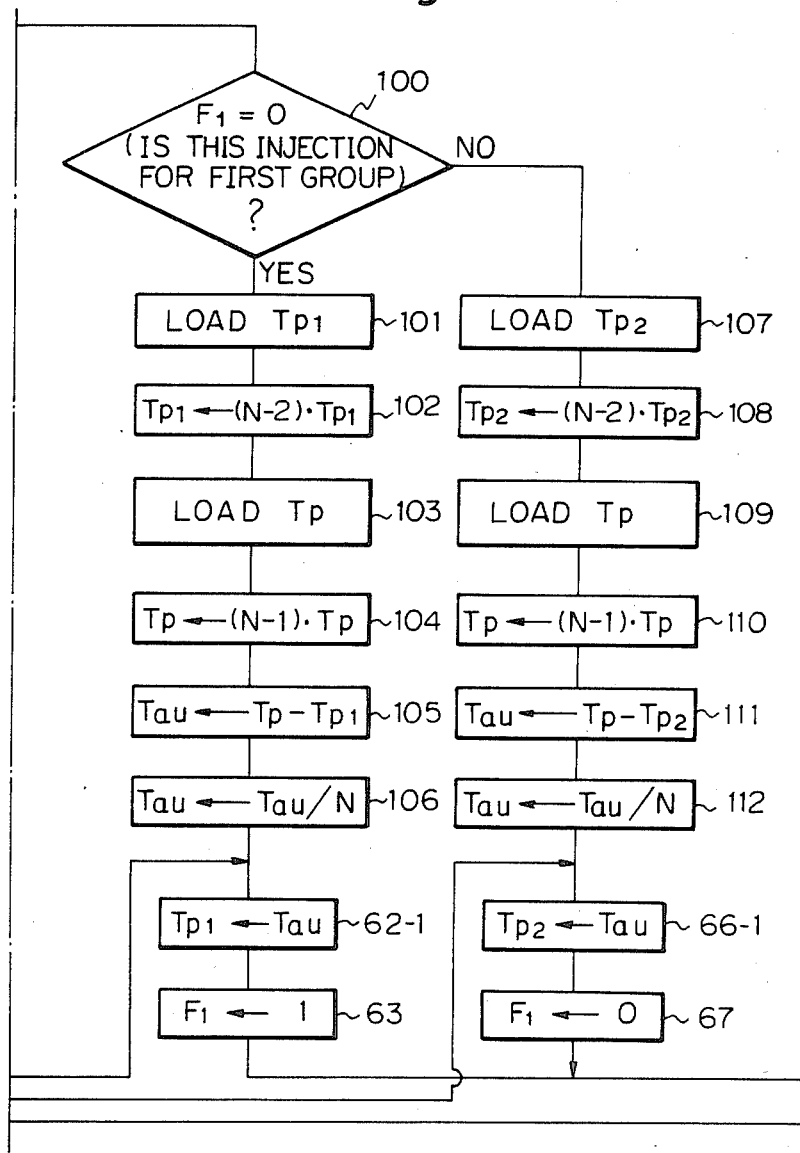
FIG. 10 shows a flow chart of a routine for calculating the final injection amount in a second embodiment of the present embodiment.
Figure 10C:
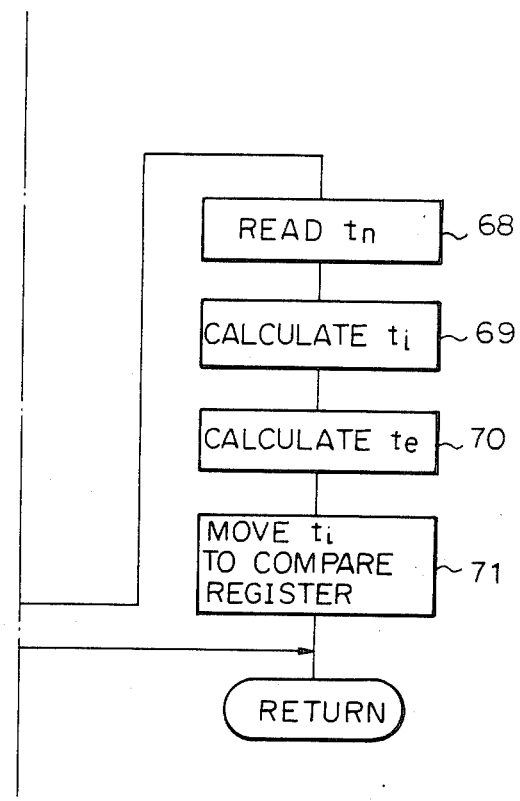

FIG. 10 shows a flowchart, corresponding to FIG. 5 in the first embodiment, for calculating a final fuel injection amount in the second embodiment. This second embodiment features, with respect to the first embodiment, the inclusion of a logical unit for maintaining an equal amount of injected fuel between two consecutive injections during a steady state condition of the engine.

When compared to FIG. 5, additional steps after 99 are provided. At point 99 it is judged if the engine is in the steady state. This judgement is attained by detecting a rate of change of the ratio of the engine speed to the intake air amount, a rate of change in the engine speed, a rate of change in the vehicle speed, or a rate of change of the intake vacuum, and by judging if the rate is larger than a preset value. When the engine is not in the steady state, i.e., the engine is under acceleration or deceleration, the program goes to steps after step 59, which is the same as the step 59 in FIG. 5 in the first embodiment. As a result, a final injection amount Tau now to be injected is equal to the basic fuel injection amount Tp for two consecutive fuel injections diminished the preceding mount of fuel as injected, Tp$_1$. Therefore, the amount of fuel Tau which is short with respect to the calculated value Tp is always injected, as already illustrated with reference to FIG. 9 regarding the first embodiment. Therefore, an appropriate amount of fuel for maintaining a required air/fuel ratio is always injected to attain the required acceleration. FIG. 11-(a) illustrates schematically the change in an amount of fuel actually injected Tau, Tau', Tau", Tau''', and Tau'''' as the difference between the basic fuel amounts Tp, Tp', Tp", and Tp''' and the amount preceding the injected fuel Tp$_1$, Tp$_1$', and Tp$_1$". FIG. 11-(a) corresponds to FIG. 9-(b) in the first embodiment.

When the engine is in the steady state, the result of the judgement at point 99 becomes "Yes". Thus the program goes to the steps after step 100. At point 100 it is judged if flag F$_1$ is 0, i.e., the injection now to be attained is for the first group. When the injection is for the first group, the program goes to point 101, where the injection amount at the preceding injection, Tp$_1$, is read. At point 102, Tp$_I$ is multiplied by N−2 and moved to Tp$_1$, wherein N is an integer larger than 2. The value of N determines the rate of compensation of the difference in the injected fuel amount between two adjacent injections. The larger the value N, the faster becomes the rate of compensation. In order to ease the calculation under the binary code, N is conveniently expressed by $2^n$, i.e., as 16 or 32. However, the present invention is not necessarily limited to this value. At point 103, the newest basic fuel amount Tp is read. At point 104, the basic amount is multiplied by N−1 and moved to Tp. At point 105, Tp−Tp$_1$ is moved to Tau as the final injection amount. At point 106, Tau/N is moved to Tau.

When the injection to be attained is for the injection of the second group, the routine goes to steps 107 to 112, which correspond to steps 101 to 106 for the first group. In a similar way, a final injection period Tau is calculated as a difference between the basic injection amount Tp multiplied by N−1 and the preceding injected amount Tp$_1$ multiplied by N−2 averaged by N. In this case N−1 and N−2 are weight factors for calculating a mean value.

The execution of the fuel injection effected by the steps after 68 is equal to the corresponding steps in FIG. 5. As a result, the calculated final amount of fuel Tau is injected.

Now the principle for equalizing the injected amount of fuel between adjacent injections will be described. Assuming that the engine has entered a steady state from the transient state, a difference occurs between the two consecutive injections, as will be clearly seen from FIG. 9-(a) in the first embodiment, since, in this Figure, the injected amount Tau when the engine just has entered the steady state is not usually equal to one half of the basic fuel amount Tp, which is always equal between the consecutive injections during the steady state. The final injected amount Tau$_i$ after the execution of the injection amount calculating number i of the routines (steps 102 to 106 or 108 to 112) is obtained by the following equation.

$$Tau_i = -(1-2/N)^{i-1}(Tau_1 - Tp/2) + Tp/2 \qquad (5)$$

In this equation Tau$_1$ denotes the first fuel injected amount just after the engine has entered the transient state from the preceding steady state. In the above equation, the absolute value of (1−2/N) is smaller than 1, the term $(1-2/N)^{i-1}(Tau_1-Tp/2)$ approaches zero as the injections are repeated. Thus, the injected fuel amount Tau finally is equal to Tp/2, and therefore, the amount of fuel for two adjacent injections is equalized during the steady state condition. The equalization of the consecutive injections is very advantageous when the two-grouped injection system is employed as in the embodiment. In the grouped injection system, the difference between the consecutive injections spaced at 360 degrees would generate a difference in the timing of the finishing of the fuel injections between the consecutive injections, causing a poor stratification of the combustible mixture, deteriorating driveability and increasing toxic emissions. The equalization of the fuel injection period between two consecutive injections according to the embodiment always allows a synchronization of the finishing timing of two consecutive injections in the corresponding group with the intake stroke. Therefore, an intended stratified effect can be realized.

FIG. 11-(b) illustrates, for the second embodiment realized by FIG. 10, the change in the injected amount of fuel Tau as time lapses during the steady state. At the first stage, the injected amount Tau is spaced from Tp/2. However, as the time lapses further by the repetition of the injections, the injected amount approaches Tp/2 as shown by Tau', Tau" and Tau'''.

Figure 12B:
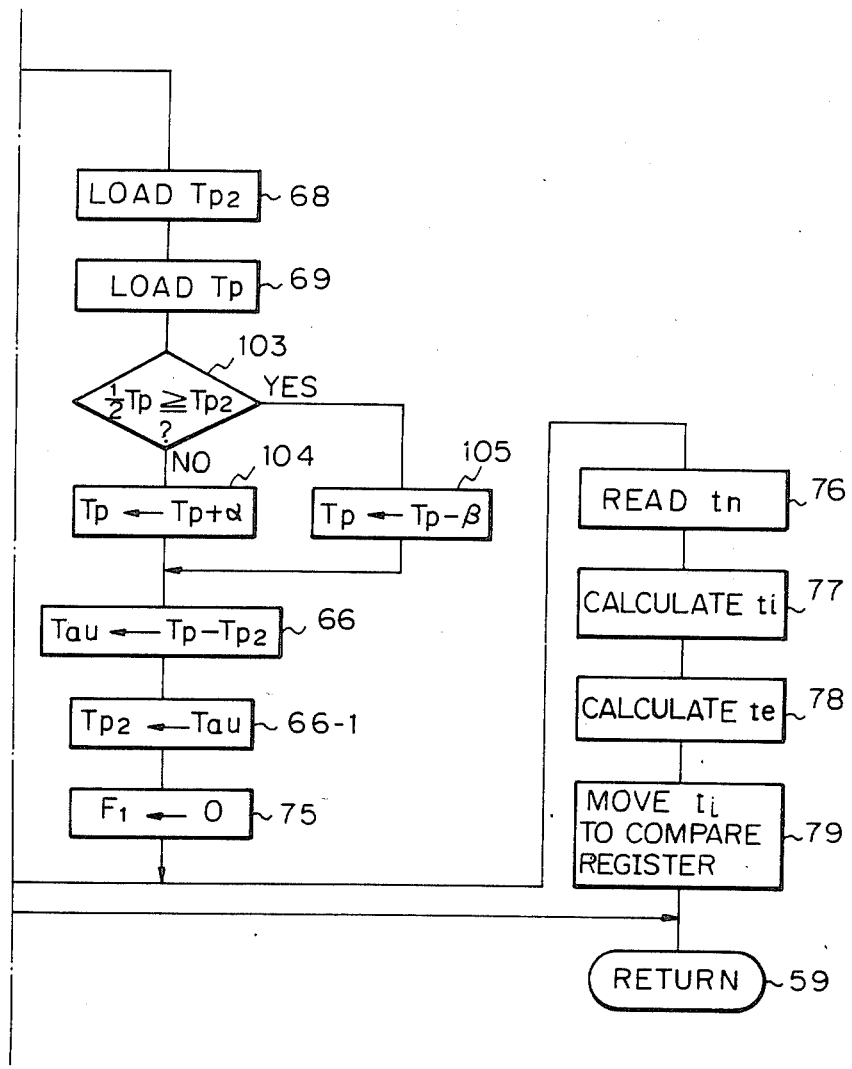
FIG. 12 shows a flow chart of a routine for calculating the final injection amount in a third embodiment of the present invention.

FIG. 12 shows a routine for calculating a final fuel injection amount in a third embodiment. This routine includes, similar to FIG. 10, steps 100' to 102' or 104' to 105' of equalizing the injected amount between the consecutive injections. The routine, however, eliminates steps after 99 in FIG. 10 for switching the system for a transient state and steady state. This system, of course, can be incorporated into the routine of FIG. 11.

In FIG. 12, when the injection is for the injection of the first group, at step 100', it is judged if half of the basic amount, Tp/2, is larger than the injected fuel amount at the preceding injection, Tp1. When $Tp/2 \geq Tp_1$, the routine goes to point 102' where $Tp+\alpha$ is moved to Tp. When $Tp<Tp_1$, the routine goes to point 102 where $Tp-\beta$ is moved to Tp. In this case, $\alpha$ or $\beta$ is suitably selected so that the injection amount Tau approaches Tp/2 at an appropriate rate after the engine has entered the steady state from the transient state. If a large value of $\alpha$ or $\beta$ is selected, a quick equalization can be obtained, but control of the air/fuel ratio is worsened. An opposite result is obtained if a small value of $\alpha$ or $\beta$ is employed. The same equalization routine can be attained when the injection is for the second group effected at points 103' to 105' ("No" at point 59).

While the embodiments as illustrated are directed to the grouped injection system, the invention can be applied to a fuel injection system where all of the injectors are independently operated for each cylinder, or a system where all of the injectors are simultaneously operated.

While the embodiments as illustrated are directed to a four-cylinder internal combustion engine, this invention can be applied to engines having any other number of cylinders, such as a 6-cylinder or 8-cylinder engine. In the case of a 6 cylinder engine, the injectors are divided into three groups and the cylinders in each of the groups have a phase difference of 360 degrees CA.

We claim:

1. A fuel injection system for a four stroke internal combustion engine having a crankshaft, the injection system comprising:
    timing means for providing successive timing signals corresponding to preselected crankshaft angle positions in one engine cycle;
    means for injecting predetermiend amounts of fuel successive into the engine in response to preselected ones of said successive timing signals;
    first calculating means for calculating, in accordance with engine operating conditions, a basic amount of fuel to be delivered to the engine by means of a plurality of consecutive fuel injections by the injecting means;
    memory means for storing, prior to a present timing signal, data of preceding amounts of fuel injected by said injecting means upon receipt of preceding timing signals; second calculating means for calculating a final amount of fuel to be injected corresponding to a difference between the basic amount calculated by the first calculating means and the data stored in the memory of the preceding amounts of fuel; and
    means responsve to said present timing signal from the timing means for operating the injecting means for injecting a single amount of fuel corresponding to said calculated final amount of fuel.

2. A system according to claim 1, further comprising means for correcting the calculated final amount of fuel to be injected so that the injected amounts of fuel for two consecutive fuel injections are equalized during a steady state condition of the engine.

3. A system according to claim 2, wherein said correction means comprises first correcting means for correcting the amount of fuel injected during the preceeding injection, second correction means for correcting the basic fuel amount, and means for obtaining a mean value of the difference between the corrected preceding injected amount and the basic amount, the means value being the final amount of fuel to be injected.

4. A system according to claim 2, wherein said correction means comprises means for calculating a difference between the basic fuel amount and the mean basic amount of fuel to be injected during one injection, and means for adding the difference value to the basic amount which is used to calculate the amount of fuel to be injected.

5. A system according to claim 2, further comprising means for detecting a steady state condition of the engine, said equalization being attained in response to detection of the steady state condition.

6. A system according to claim 1, wherein the engine is a multi-cylinder engine, said injecting means comprising a plurality of injectors, one injector for each of the respective cylinders, the cylinders being grouped into at least two groups of cylinders so that the injectors in each of the groups have operating phases spaced 360 degrees of crankshaft angle from each other, the first calculating means calculating a basic amount of fuel for a plurality of consecutive fuel injections in each group, the memory means storing the amount of the preceding injection for each group, the second calculating means calculating the final amount as the difference between the basic amount value and the preceding stored value for the same group, and the operating means attaining an independent fuel injection for each of said at least two groups.

7. A fuel injection system for a four stroke multicylinder internal combustion engine having a crankshaft, the injection system comprising:
    injectors provided for each cylinder for injecting predetermined amounts of fuel into the engine;
    said injectors being divided into groups of at least two injectors, the cylinders corresponding to the injectors in each of the groups having respective operational phases which are spaced from each other by a crankshaft angle of 360 degrees; and
    injection control systems provided for each of the groups for attaining fuel injections which are independent from each other between the groups, each of the injection control systems comprising:
        timing means for providing timing signals corresponding to crankshaft positions in one engine cycle for the respective injector group;
        first calculating means for calculating, in accordance with engine operating conditions, a basic amount of fuel for one engine cycle;
        memory means for storing data of the preceding amounts of fuel injected by said injectors in the corresponding injector group upon receipt of the corresponding preceding timing signals;
        second calculating means for calculating a final amount of injected fuel corresponding to the difference between the basic amount calculated by the first calculating means and the data stored in the memory of the preceding injected amounts of fuel; and means, responsive to a subsequent timing signal from the timing means for operating the injectors so as to attain a fuel injection in accordance with ther calculated final amount of injected fuel.

8. A system according to claim 7, wherein each injection control system further comprises means for correcting the final amount of injected fuel so that the injected amounts of fuel for two consecutive fuel injections in the corresponding group are equalized.

9. A system according to clasim 8, wherein said correction means comprises first correcting means for correcting the amount of fuel injected during the preceding injection, second correction means for correcting the basic amount of fuel, a weight of correction of the latter being larger than the former, and means for obtaining a mean value of the difference between the corrected preceding injected amount and the basic amount, the mean value being the final amount of fuel to be injected.

10. A system according to claim 8, wherein said correction means comprises means for calculating a diference between the basic fuel amount and the mean basic amount of fuel to be injected during one injection, and means for adding the difference value to the basic amount which is used to calculate the amount of fuel to be injected.

11. A system according to claim 7, wherein each injection control system further comprises means for detecting a steady state condition of the engine, said equalization being attained only in response to detection of the steady state condition.

12. A system according to claim 1 wherein said plurality of consecutive fuel injections for each basic amount of fuel is equal to two.

* * * * *

UNITED STATES PATENT AND TRADEMARK OFFICE
CERTIFICATE OF CORRECTION

PATENT NO.  :  4,700,681
DATED       :  20 October 1987
INVENTOR(S) :  Tooru HANAFUSA et al.

It is certified that error appears in the above-identified patent and that said Letters Patent is hereby corrected as shown below:

Column  4, line 23:  change "shownby" to -- shown by --.

Column  8, line 65:  change "trme" to -- time --.

Column 10, line 46:  change "adjacent" to -- consecutive --.

Column 12, line 10:  change "means" to -- mean --.

Column 14, line  4:  change "difer-'" to -- differ- --.

Signed and Sealed this

Twenty-sixth Day of April, 1988

*Attest:*

DONALD J. QUIGG

*Attesting Officer*    *Commissioner of Patents and Trademarks*